(12) United States Patent
De Laforcade (10) Patent No.: US 7,661,310 B2
(45) Date of Patent: Feb. 16, 2010

(54) PORTION-TAKER DEVICE INCLUDING A MEASURING SCOOP

(75) Inventor: Vincent De Laforcade, Rambouillet (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 11/730,903

(22) Filed: Apr. 4, 2007

(65) Prior Publication Data

US 2007/0234802 A1  Oct. 11, 2007

Related U.S. Application Data

(60) Provisional application No. 60/796,562, filed on May 2, 2006.

(30) Foreign Application Priority Data

Apr. 7, 2006 (FR) .................................. 06 51262

(51) Int. Cl.
*G01F 19/00* (2006.01)
(52) U.S. Cl. ........................... 73/429; 73/426; 141/108; 30/128
(58) Field of Classification Search ............... 73/426, 73/429; 141/108, 109, 358; 30/128, 141, 30/147, 149, 150, 324
See application file for complete search history.

(56) References Cited

U.S. PATENT DOCUMENTS

| D22,407 | S | * | 5/1893 | Hinde | ........................ D7/644 |
| 2,313,213 | A | * | 3/1943 | Atherley | ..................... 222/309 |
| 2,660,784 | A | | 12/1953 | Greene | |
| 2,664,753 | A | * | 1/1954 | Hein | ........................ 73/429 |
| 2,669,194 | A | * | 2/1954 | Brown | ........................ 425/286 |
| 2,756,698 | A | | 7/1956 | Eichin et al. | |
| 4,161,381 | A | | 7/1979 | Sciortino | |
| 4,392,806 | A | | 7/1983 | Houle | |
| 4,881,668 | A | * | 11/1989 | Kitterman et al. | ........... 222/482 |
| 5,116,388 | A | * | 5/1992 | Brooks | ........................ 8/405 |
| 6,105,259 | A | * | 8/2000 | Meyers et al. | ................. 30/323 |
| 6,162,039 | A | | 12/2000 | Schwarz et al. | |
| 6,408,521 | B1 | | 6/2002 | Pye et al. | |
| 6,997,695 | B2 | | 2/2006 | Horng | |

(Continued)

FOREIGN PATENT DOCUMENTS

DE  197 36 078 C1  2/1999

(Continued)

OTHER PUBLICATIONS

GourmetSleuth.comTM (<http://www.gourmetsleuth.com/portionscoopequivalent.htm> Published Mar. 26, 2006. Accessed online on Mar. 16, 2008).*

*Primary Examiner*—Lisa M Caputo
*Assistant Examiner*—Punam Patel
(74) *Attorney, Agent, or Firm*—Oliff & Berridge, PLC (57) ABSTRACT

The present invention provides a portion-taker device for taking a substance, the device including at least one measuring scoop, which scoop comprises:
  a frame; and
  a flap mounted to pivot relative to the frame and co-operating with it to define, in a first position, the bottom of a cavity that it used for taking the substance; the frame being arranged in such a manner as to enable a user to exert thrust on the flap on its side opposite from the cavity so as to reduce the volume thereof until the flap reaches a second position in which the volume of the cavity is substantially zero.

32 Claims, 4 Drawing Sheets

U.S. PATENT DOCUMENTS

| | | | |
|---|---|---|---|
| 7,100,443 B2 * | 9/2006 | Kilduff et al. | 73/429 |
| 2003/0029770 A1 * | 2/2003 | MacKinnon | 206/553 |
| 2004/0134079 A1 | 7/2004 | Lion et al. | |
| 2005/0160807 A1 | 7/2005 | Kilduff et al. | |

FOREIGN PATENT DOCUMENTS

| | | |
|---|---|---|
| EP | 1 371 314 A1 | 12/2003 |
| EP | 1 516 539 A1 | 3/2005 |
| JP | 07-286885 | 10/1995 |
| WO | WO 2004/069017 A1 | 8/2004 |

* cited by examiner

PORTION-TAKER DEVICE INCLUDING A MEASURING SCOOP

This non provisional application claims the benefit of French Application No. 06 51262 filed on Apr. 7, 2006 and U.S. Provisional Application No. 60/796,562 filed on May 2, 2006.

The present invention relates both to a portion-taker device including a measuring scoop, and to a packaging and dispensing kit including at least one substance from which portions are to be taken by means of such a device.

BACKGROUND

International patent application WO 2004/069017 discloses an ice cream scoop comprising a rigid annular frame and a bottom in the form of a cap made of a flexible material. The ice cream contained in the scoop can be expelled by deforming the flexible bottom with a finger.

Application EP 1 371 314 A1 describes a scoop of structure analogous to that described in application WO 2004/069017, together with a lever acting on the flexible bottom.

Application EP 1 516 539 A1 also discloses an ice cream scoop comprising two elements that are pivotally mounted relative to each other, a spring being interposed between the two elements to space them apart. One of the elements includes a frame at one end, and the other element includes a cup designed to co-operate with the frame to form a cavity for taking ice cream.

Each of U.S. Pat. Nos. 4,392,806, 2,756,698, and 4,161,381 discloses an ice cream scoop comprising a cup provided with a bottom tongue of rounded shape and capable of pivoting to expel the ice cream.

U.S. Pat. No. 2,660,784 describes a measuring scoop having a portion-taking cavity with a pivoting tongue in the bottom thereof. The tongue is provided with a spring-forming portion and it serves to expel the substance.

U.S. Pat. No. 6,162,039 describes a device for taking a portion of a foodstuff, the device comprising a scoop with a plate placed in the bottom thereof to expel its content.

Patent application US 2005/160807 describes a device having a handle and a measuring scoop including a portion-taking cavity having, in its bottom, a plate that is capable of pivoting under the action of a pressbutton situated on the handle.

Patent application JP 07 286885 describes a scoop having a structure close to that described in application US 2005/160807. It describes two variants: in the first variant, the user turns an element on the handle that is also secured to the bottom of the cavity; in the second variant the user moves a pushbutton on the handle, thereby driving a belt that exerts thrust on the bottom of the cavity.

Patent application DE 197 36 078 describes a measuring device comprising a measuring receptacle and a side wall that is movable relative to the measuring receptacle.

U.S. Pat. No. 6,408,521 describes a device for taking a foodstuff, the device having a scoop at one of its ends and a measuring scoop at each other end. The foodstuff can travel inside the handle from one end of the device to the other.

Known devices for taking and extracting a ball of ice cream are not necessarily suitable for non-food substances of different consistency and stickiness, and in addition they do not set out to measure accurately. Furthermore, at least some of those devices can be a relatively expensive to make.

Also, in the field of hair-care products, and in particular for coloring or bleaching, bleaching pastes, in particular those obtained by high-pressure extrusion, are occupying an increasing market share, replacing formulations that are more liquid.

These pastes, which are normally used mixed with a developer in predefined proportions, can present consistency that is quite firm, with a tendency to adhere easily to the walls of scoops used for taking them, which is harmful for measurement accuracy and complicates the mixing operation.

SUMMARY

The invention seeks in particular to propose a novel portion-taker device making it easy to take and deliver a measured quantity of a paste, such as a bleaching paste, for example.

In another of its aspects, the invention also seeks to provide a portion-taker device that is capable of being manufactured at a cost that is compatible with it being distributed on a large scale, in particular accompanying hair-care products.

In one of its aspects, the invention provides a portion-taker device for taking a substance, the device including at least one measuring scoop. The scoop comprises:
 a frame; and
 a flap mounted to pivot relative to the frame, co-operating with it to define, in a first position, the bottom of a cavity that is used for taking the substance.

The flap may be plane, i.e. it may present a plane surface on each of its faces, one of its faces defining the bottom of the cavity, and its other face being opposite from the cavity.

The flap does not need to have any flexible material at its periphery, in particular in its zones that come into contact with the frame. For example, it does not need to have any sealing gasket at its periphery.

The face of the flap opposite from the cavity may be completely free, and in particular it does not need to be connected to any mechanism. More generally, the flap may be completely free and does not need to include any mechanism.

The flap may pivot relative to the frame, being connected thereto via only one of its sides, the maximum pivot angle possibly being less than or equal to 220°, for example.

The frame may be arranged in such a manner as to enable a user to exert thrust on the flap on its side opposite from the cavity, so as to reduce the volume of the cavity. In particular, the frame may be made in such a manner that the flap can reach a second position in which the volume of the cavity is substantially zero.

The pivot angle of the flap relative to the frame between its first and second positions may, in particular, be less than or equal to about 40°.

The second position of the flap may correspond to a position in which one of the faces of the flap defines the bottom of a cavity of a volume substantially equal to the volume of the cavity defined by the flap in the first position.

The measuring scoop may serve to take a predefined quantity of substance when the flap is in the first position, for example by using the measuring scoop directly to take the substance from inside a receptacle containing the substance, where appropriate with the top edge of the frame being scraped against a receptacle or against a scraper in order to remove excess substance.

The invention makes it possible to eject substantially all of the substance contained in the cavity as filled in this way, by causing the flap to pivot from the first position to the second position. Once the flap is in the second position, the user can scrape the top edge of the frame again, where appropriate, in order to empty the scoop substantially completely.

The opening through which the substance is placed in the cavity, and the opening through which the substance is ejected from the cavity are the same.

The invention thus makes it easy to take and deliver a relatively accurate quantity of substance, without making it very difficult to clean the measuring scoop. This is advantageous in the field of hair care, whenever the paste being taken needs to be mixed extemporaneously with a developer or with some other compound in well-defined proportions; however the invention can find other applications in the fields of cosmetics or pharmacy, amongst others.

Since the substance contained in the cavity can be extracted manually by pressing a finger against the flap, it is possible, in at least some embodiments, for the device of the invention to present a structure that is relatively simple and inexpensive to make, unlike more complex devices that include a resilient return member such as a spring or a hinged lever, for example.

Furthermore, the user can cause the flap to pivot without coming directly into contact with the substance contained in the cavity, thus reducing any risk of dirtying and/or polluting the substance with impurities transported by the fingers.

Preferably, the flap presents a face facing the cavity that is substantially plane, thus making it easier to scrape once it is in the second position, e.g. by making contact with the rim of a receptacle or with a scraper.

In an embodiment of the invention, the flap pivots relative to the frame about a pivot axis, and the frame presents at least a portion of its inside surface that is circularly symmetrical, e.g. being in the form of a cylindrical sector, having a generator line parallel to the pivot axis and a circularly arcuate director line centered on the pivot axis. The flap may pivot without any resilient return action, continuing to occupy the position in which the user leaves it, however in a variant, the flap may be subjected to a certain amount of resilient return action, e.g. associated with the way in which the hinge is made.

Advantageously, when it is between its first and second positions, the flap occupies substantially the entire inside section of the frame, thereby reducing the risk of failing to eject any traces of substance adhering to the frame.

In an embodiment of the invention, the flap presents a free edge having at least a portion that presses against the frame when the flap is between its first and second positions. By way of example, this portion extends along at least the distal edge of the flap that is remote from the above-mentioned pivot axis. Where appropriate, the free edge of the flap may also include two side portions bearing against the frame when the flap is between the first and second positions.

The shape of the flap may be substantially polygonal, for example being rectangular, square, triangular, trapezoidal, or circular, amongst others, the frame presenting a shape that matches the shape of the flap.

When the device includes a handle, the pivot axis of the flap may be perpendicular to the longitudinal axis of the handle.

The top edge of the frame that constitutes the leading edge may be situated in a plane, and the handle may be generally flat in said plane.

The flap may be connected to the handle by a film hinge. The flap can thus be made by being molded integrally with at least one of the frame and the handle of the device. The flap and at least a portion of the frame may be made of a plastics material, in particular a polyolefin, e.g. polypropylene.

In an embodiment of the invention, the frame has an opening, thus enabling the user to press directly against the flap on the face thereof that is opposite from the cavity, by pressing through the opening in the frame.

The frame may be made of a single material, in particular of a material that is relatively rigid such as polypropylene. Where appropriate, the measuring scoop may be made entirely of a single material, in particular a thermoplastic material, e.g. polypropylene. The scoop can thus be made without any elastomer, which can be advantageous for certain substances that are rich in solvents, for example certain bleaching pastes that can turn out to be incompatible with numerous elastomers.

In another embodiment of the invention, the frame includes an elastically deformable membrane that may close the bottom.

In order to cause the flap to pivot from the first position towards the second position, the user then exerts thrust against the flap via the membrane, which can further reduce any risk of contact between one or more of the user's fingers and the substance contained in the cavity.

The flap may also be arranged to pivot beyond of the second position, so as to make it easier to clean the measuring scoop.

The frame may include at least two cheeks, which may be substantially parallel, and the elastically deformable membrane may define at least the bottom portion of each of the cheeks. This can enable the user to exert thrust on the flap over a greater distance.

The frame may include a rigid top portion so as to form a leading edge that guarantees satisfactory penetration of the scoop into the substance that is to be taken.

The elastically deformable membrane may be made by overmolding a material, in particular an elastomer, onto the rigid portion of the frame. By way of example, the membrane may be made of polyethylene terephthalate (PET), EPDM, Santoprene®, or rubber, this list not being limiting.

Catches in relief may be provided at the interface between the elastically deformable membrane and the rigid portion of the frame in order to improve retention of the membrane on said portion.

In use, the angular travel of the flap may be as great as 90° or more.

In an embodiment of the invention, the frame is arranged in such a manner that, on passing from the first position to the second position, the flap can pivot through an angle lying in the range 30° to 50°, for example close to 40°.

Advantageously, the frame includes at least a first abutment against which the flap bears when it is in one of the first and second positions.

In particular, the frame may have an abutment for holding the flap stationary in the first position while the substance is being taken. By way of example, this abutment can be made on the inside surface of the distal wall of the frame, remote from the pivot axis.

A second abutment may serve to prevent the flap from going beyond the second position, away from the first position. The flap may be held in place in the second position against said abutment by a finger, e.g. when the scoop is scraped against the rim of a receptacle.

When appropriate, the above-mentioned abutments can be made so as to be suitable for the flap to go past them when sufficient force is exerted thereon. This can enable the flap to be molded in a configuration other than the configurations taken by the flap on passing from the first position to the second position. In particular, the second abutment can be made with a chamfer that makes it easier to pass from the molding configuration to the first position. The flap may also be made with its distal edge having a chamfer that makes it easier to go past the second abutment.

In an embodiment of the invention, the frame includes one or more portions in relief arranged to generate at least one hard point, informing the user that the flap has gone past or has reached one of the first and second positions.

In an embodiment, the handle is hollow, thereby reducing the cost of materials and contributing to saving the environment.

In particular, the handle may comprise two assembled-together portions, which portions may be connected together by a film hinge. The hinge may be situated on a lateral side of the handle so as to make unmolding thereof easier. In a variant, the film hinge may extend at one of the longitudinal ends of the handle.

The handle may include a coating of a material, in particular of an elastomer, which coating is overmolded on the two portions of the handle in order to keep them together. Under such circumstances, portions in relief may be made on the handle portions in order to contribute to holding them together on a temporary basis. These portions in relief may co-operate so as to enable the handle portions to be snap-fastened together, for example.

The two handle portions may also be secured to each other by any other means, e.g. by adhesive or by heat-sealing.

The measuring scoop may be placed at a first end of the handle of the device, and the handle may also include another measuring scoop at a second end, opposite from the first. The measuring scoops may be different, for example the additional measuring scoop may define a portion-taking cavity of volume that is constant, without a pivoting flap. By way of example, the second scoop may be used for taking a liquid for mixing with the paste that is taken with the first scoop. In a variant, both measuring scoops may present respective pivoting flaps, as described above.

In another of its aspects, the invention also provides a kit comprising:
    at least one substance, in particular a non-food substance, e.g. a cosmetic; and
    a portion-taker device as defined above.

By way of example, the substance is a substance for bleaching hair, of pasty consistency, and designed to be mixed extemporaneously with a developer. The substance may be packaged in a jar.

In another of its aspects, the invention also provides a method of fabricating a device as defined above, the method including the following step:
    molding the flap and at least a portion of the frame, the flap being molded in a configuration in which it extends outside the frame, e.g. partially above the leading edge of the frame.

In the method, the frame can be made together with the handle by molding a material. The handle may comprise two portions that are assembled together after the molding operation.

The method may further include overmolding a membrane of elastomer serving to close the frame and/or to cover at least part of the handle.

In another of its aspects, the invention also provides a method of taking a portion of a substance, in particular a paste, the method comprising the following successive steps:
    taking the portion of the substance by using a portion-taker device as defined above; and
    causing the flap to pivot towards the second position in order to extract the substance from the scoop.

The method may further include the following step:

while the flap is in the second position, it is scraped in contact with an article, in particular the rim of a receptacle, in order to remove any substance that may still be present thereon.

In another of its aspects, the invention also provides a device for taking a portion of a substance, the device comprising:
    a measuring scoop which comprises at least:
        a frame including a flexible membrane in the form of a cap; and
        a flap pivotally mounted relative to the frame and capable of co-operating therewith to define a cavity for taking a portion of the substance, the membrane being arranged to enable the user to exert thrust on the flap through the membrane, so as to reduce the volume of the cavity.

BRIEF DESCRIPTION OF THE DRAWINGS

The present invention can be better understood on reading the following detailed description of nonlimiting embodiments thereof, and on examining the accompanying drawings, in which.

MORE DETAILED DESCRIPTION

Figures 1, 2, 3:
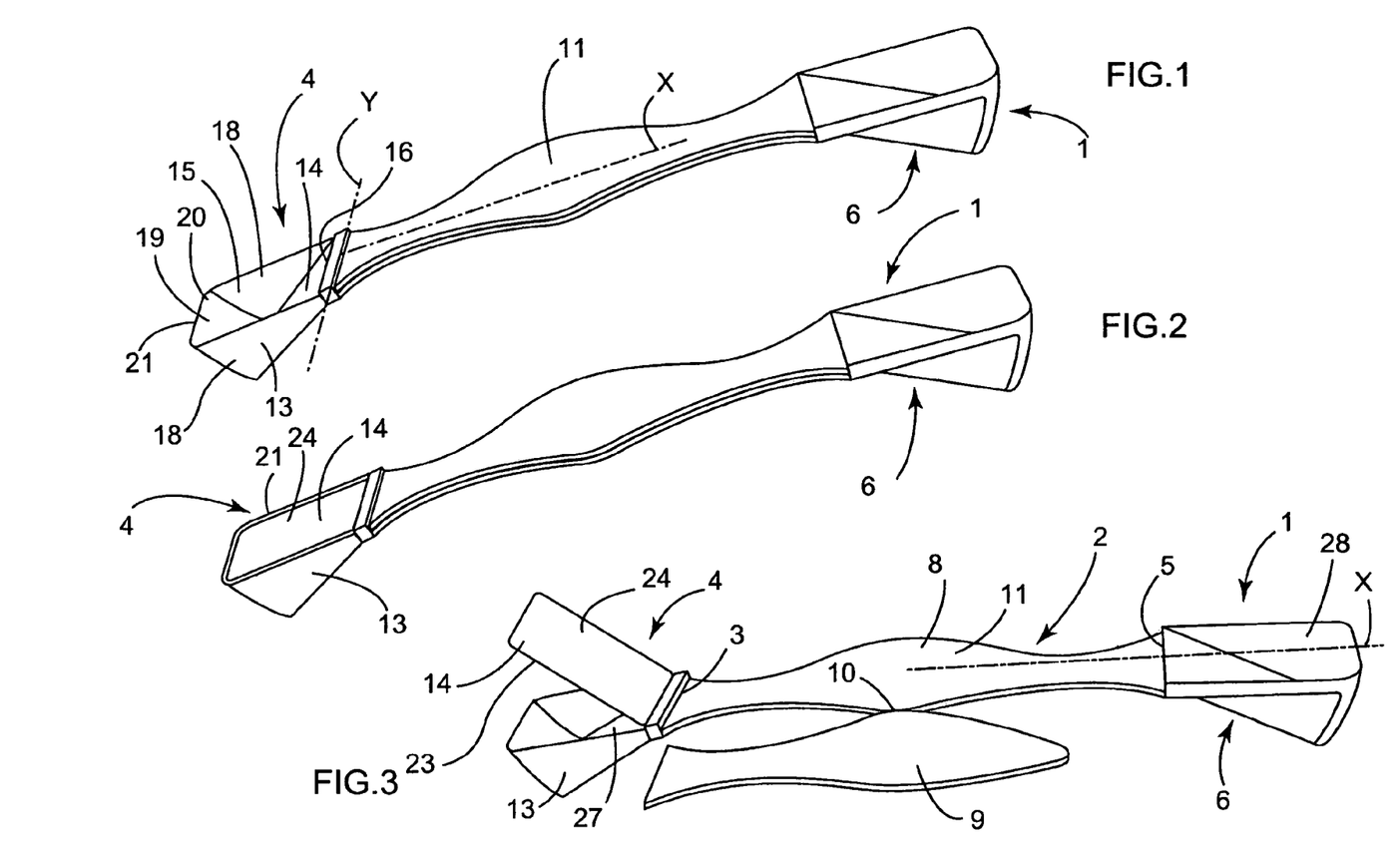
FIG. 1 is a diagrammatic and fragmentary view of the device of the invention, the flap being in a first position enabling a portion of the substance to be taken with the measuring scoop.
FIG. 2 is a diagrammatic and fragmentary view of the FIG. 1 device with the flap in a second position for extracting the portion of substance that has been taken.
FIG. 3 is a diagrammatic and fragmentary view of the FIG. 1 device in a molding configuration.

FIGS. 1 to 3 show a portion-taker device 1 comprising a handle 2 extending along a longitudinal axis X, provided at a first end 3 with a measuring scoop 4, and at another end 5 with a second measuring scoop 6.

The handle 2 is of ergonomic shape, for example having a central zone 11 that is wider than its ends 3 and 5.

The scoop 4 comprises a frame 13 and a flap 14 mounted to pivot relative to the frame 13 about an axis Y perpendicular to the axis X.

In a first angular position, the flap 14 co-operates with the frame 13 to define the bottom of a cavity 15 for use in taking a portion of substance, as shown in FIG. 2.

By way of example, the maximum volume of the cavity 15 is 15 milliliters (mL).

In the example described, the frame 13 has two substantially-parallel side cheeks 18 that are connected at a first end to the handle 2, and that are interconnected at a second end opposite to the first end by means of the distal wall 19.

The distal wall defines a circularly-symmetrical inside surface 20 in the form of a cylindrical sector having a generator line parallel to the axis Y, and a circularly arcuate director line centered on the axis Y.

The frame 13 presents a top edge 21 defining the leading edge of the scoop 4 for taking a portion of the substance.

The handle 2 is generally flat in shape, and the flap 14 is connected to the handle 2 via a film hinge 16. In the example described, the flap 14 is substantially rectangular in shape when observed from in front. The top face 24 of the flap 14 that faces the cavity 15 is substantially plane and occupies a substantially the entire inside section of the frame 13.

The flap 14 presents a free edge 23 that bears against the inside surface 20 of the frame 13 when the flap 14 passes from the first position as shown in FIG. 2 to the second position as shown in FIG. 3, in which position the volume of the cavity 15 is substantially zero, the flap 14 then coming substantially flush with the leading edge 21.

In the example described, and as shown in FIG. 1, the frame 13 defines an opening 27 that enables the user to press a finger against the flap 14 from its side opposite to the cavity 15, thus enabling it to be pivoted from the first position towards the second position.

The second measuring scoop 6 defines a cavity 28 of constant volume. In an example that is not shown, the measuring scoop 6 may be analogous to the first scoop 4, likewise being provided with a pivoting flap, and the scoops 4 and 6 may present capacities that are different or identical.

The handle 2 is a hollow, being formed by assembling together two portions 8 and 9 that are connected together on one side by a film hinge 10, which hinge may be situated substantially half way along the handle 2.

The handle 2 may be molded with the portions 8 and 9 located side-by-side, as shown in FIG. 3, after which they may be folded one against the other. The portions 8 and 9 can then be held assembled together in various ways, e.g. by adhesive, heat-sealing, or snap-fastening, or even by overmolding some other material, as described in detail below.

In the example under consideration, the device 1 is made as a single molding of a thermoplastic material, e.g. of polypropylene.

In the molding configuration, the flap 14 extends outside the frame 13. This can make the device 1 easier to unmold.

The flap 14 can be unmolded in two stages, unmolding the top face of the flap so as to release a space that allows the flap to pivot, and subsequently unmolding the face of the flap 14 that faces towards the cavity 15 and the frame.

The frame 13 may include one or more abutments against which the flap 14 presses when it is in one of the first and second positions.

Figure 4:
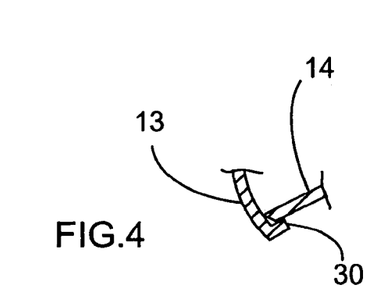
FIGS. 4 and 5 are diagrammatic and fragmentary section views showing examples of abutments that can be made on the scoop of FIGS. 1 to 3.

In particular, the frame 13 may have a first abutment 30 formed by a rim on the distal wall 19, projecting from its side opposite from the leading edge 21, as shown in FIG. 4.

Figure 5:
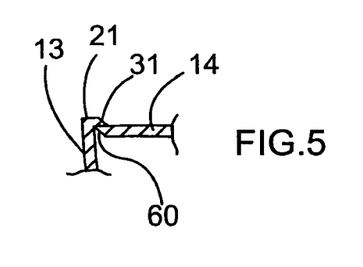

Close to its leading edge 21, the frame 13 may also include a second abutment 31 against which the flap 14 comes to bear on reaching the second position, as shown in FIG. 5.

The abutment 31 may present a chamfered shape, thus enabling the flap 14 to go past it more easily by elastic deformation when the flap 14 passes from the molding configuration to the utilization configuration.

The distal edge of the flap 14 may also present a chamfer 60 on its inside face in order to present less resistance to passing the second abutment 31 in order to reach the first position.

At least one portion in relief may be arranged to generate the feeling of a hard-point on being passed by the flap 14, thereby providing the user with a tactile warning that the flap has reached the second position, for example. Where appropriate, going past the abutment may give rise to an audible click being emitted. The hard point may be formed by a projection on the inside surface of the frame, e.g. on its distal wall 19.

The abutments 30 and 31 may be replaced by any other portions in relief capable of generating a hard point and/or of preventing the flap 14 from moving, or one or both of them may be omitted.

The device 1 can be used as follows.

The flap 14 is brought into the first position and then a quantity of substance is taken with the measuring scoop 4.

Once the cavity 15 has been filled, it is possible to scrape the leading edge 21 so as to eliminate any excess substance from the cavity 15.

Thereafter, the user presses against the flap 14 through the opening 27 so as to cause the flap 14 to pivot from the first position towards the second position in order to eject the substance.

Any substance still adhering to the flap 14 can be removed, e.g. by scraping the scoop 4 on the edge of a receptacle. The flap 14 can then be held in the second position against the abutment 31 by being pressed with the finger.

The portion of substance as taken in this way can be mixed with some other substance, which might have been taken with the second measuring scoop 6, where appropriate. For example it may comprise an oxidizer for mixing extemporaneously with the substance taken using the first scoop 4.

Naturally, if so desired, the device 1 need not have the measuring scoop 6.

Figure 6:
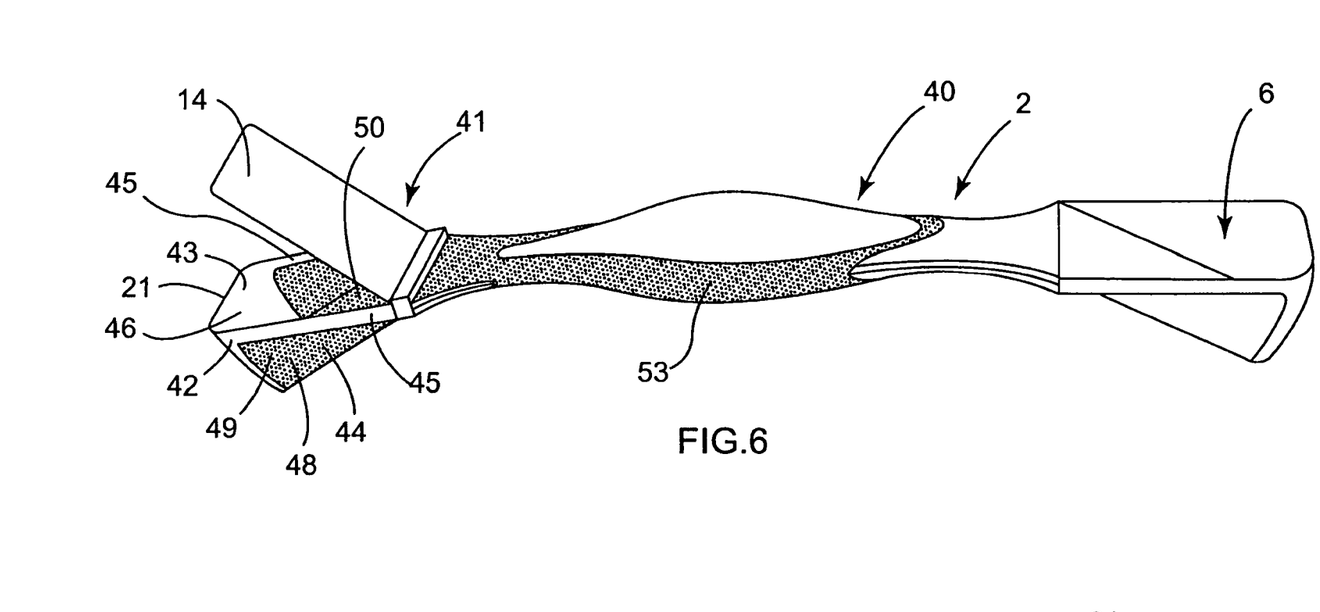
FIG. 6 is a diagrammatic and fragmentary view of a portion-taker device constituting another embodiment of the invention, prior to the flap being put in a utilization configuration.

FIG. 6 shows a portion-taker device 40, like the device 1, that comprises a handle 2 with a measuring scoop 6 at one end, and with a measuring scoop 41 at the other end.

The scoop 41 comprises a frame 42 having a rigid portion 43 and an elastically deformable membrane 44 in the form of a cap.

The rigid portion 43 defines the leading edge 21 of the scoop 41 and comprises both two substantially parallel arms 45 that are connected to the handle 2, and a distal wall 46 that interconnects the arms 45 at their ends opposite from the handle 2.

The membrane 44 forms the bottom portions 48 of the cheeks 49 of the frame, closing the bottom thereof.

The above-mentioned rigid portion 43 can be made integrally by being molded out of the same thermoplastic material as the handle 2 and the flap 14.

By way of example, the membrane 44 can be made by overmolding an elastomer onto the rigid portion 43, for example a flexible polyethylene terephthalate, an EPDM, Santoprene®, or rubber.

Catches in relief may be provided on the rigid portion 43 in order to reinforce the connection of the membrane 44 thereon.

In this example, the handle 2 can be made from two portions 8 and 9, as described with reference to FIG. 1, which portions may be held together by a coating 53 of the same material as the membrane 44 and injected at the same time as the membrane is injected.

The device 40 can be used as follows.

After taking substance with the scoop 41, the user presses against the flap 14 by pressing against the membrane 44 so as to cause the flap 14 to pivot from the first position towards the second position. The substance can then be extracted from the scoop 41, as described above.

FIGS. 7 to 13 show another embodiment of the portion-taker device 1.

Figures 7, 8, 9, 10, 11, 12, 13:
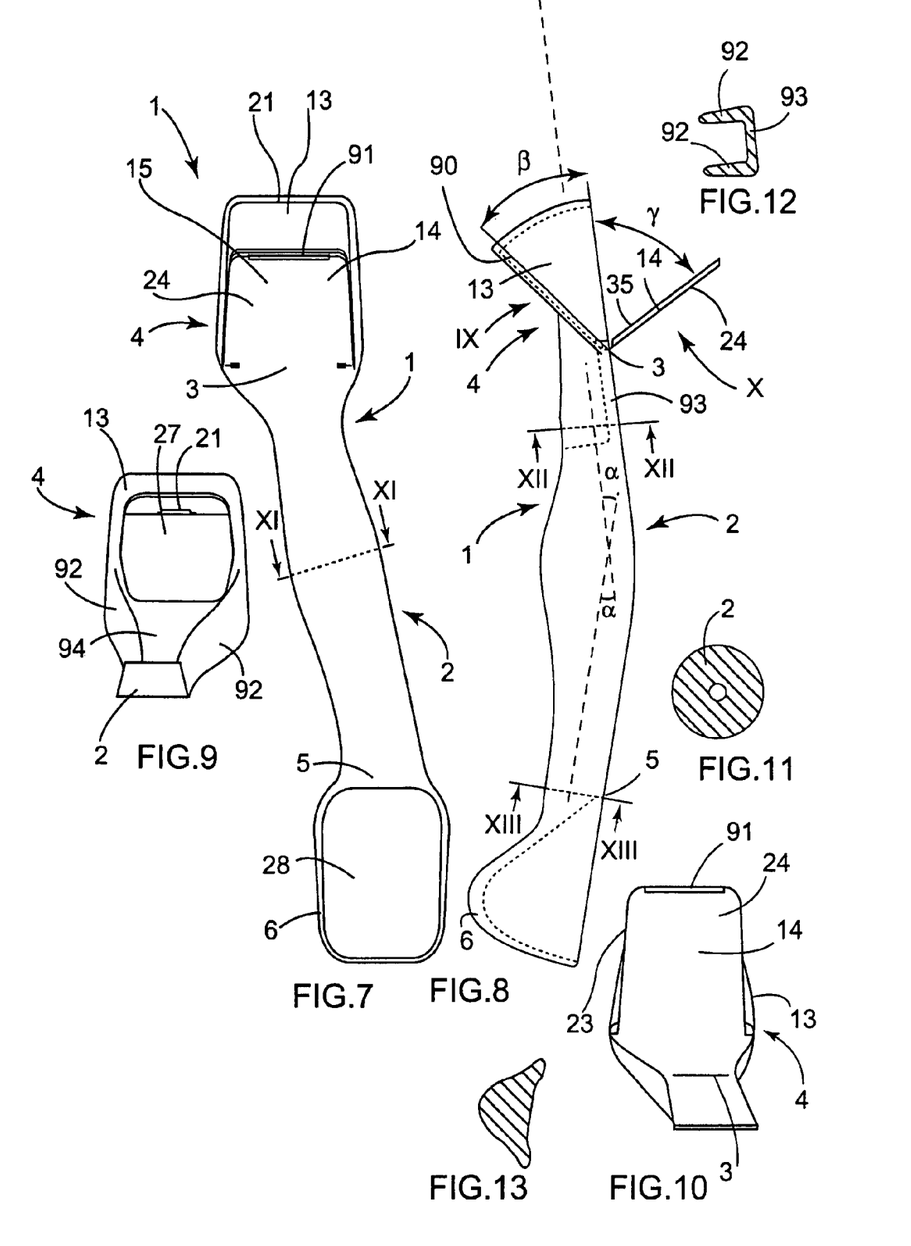
FIG. 7 is a plan view of another embodiment of the device of the invention.
FIG. 8 is a side view of the FIG. 7 device.
FIG. 9 is a view along arrow IX of FIG. 8.
FIG. 10 is a view along arrow X of FIG. 8.
FIG. 11 is a cross-section on XI-XI of FIG. 7.
FIG. 12 is a cross-section on XII-XII of FIG. 8.
FIG. 13 is a cross-section on XIII-XIII of FIG. 8.

In this embodiment, the handle 2 extends along a longitudinal axis that is not rectilinear, as can be seen in particular in FIG. 7. The device 1 can be made as a single molding of a plastics material, in particular by injection molding.

The handle 2 can be molded with a cross-section that is solid, in particular halfway along its length, and a void might form within the handle during cooling of the plastics material, as shown in FIG. 11, thus having the effect of lightening the device 1.

In this example, the frame 13 presents a rim 90 that extends over the entire inside perimeter of the frame 13.

On its distal edge, the flap 14 may present a small setback 91 making it easier to go past the leading edge 21 of the frame 13 that acts as an abutment for the flap 14 in a position where its surface 24 comes substantially flush with the edge of the frame 13 so as to define a cavity of substantially zero volume.

The device 1 may present inscriptions in the vicinity of the measuring scoops 6 and 4 in order to make the device 1 easier to use.

In the example described, the frame 13 is connected to two cheeks 92 which are interconnected by a back 93 so as to define a void that can serve, for example, to enable the user to press more easily against the bottom face 35 of the flap 14 in order to bring it from the first position to the second position. The void is given reference 94 as can be seen in FIG. 9.

In this embodiment, it can also be seen that the portion of the device 1 that includes the measuring scoop 4 is at an angle α with the axis of the portion of the device 1 that includes the scoop 6. By way of example, this angle α is about 7.5°.

The total pivot stroke of the flap 14 between the first and second positions is the angle β of about 39°.

The device 1 can be molded with the flap 14 in the position shown in FIG. 8, then making an angle γ of 600 for example with the second position of the flap 14.

Figures 14, 15, 16:
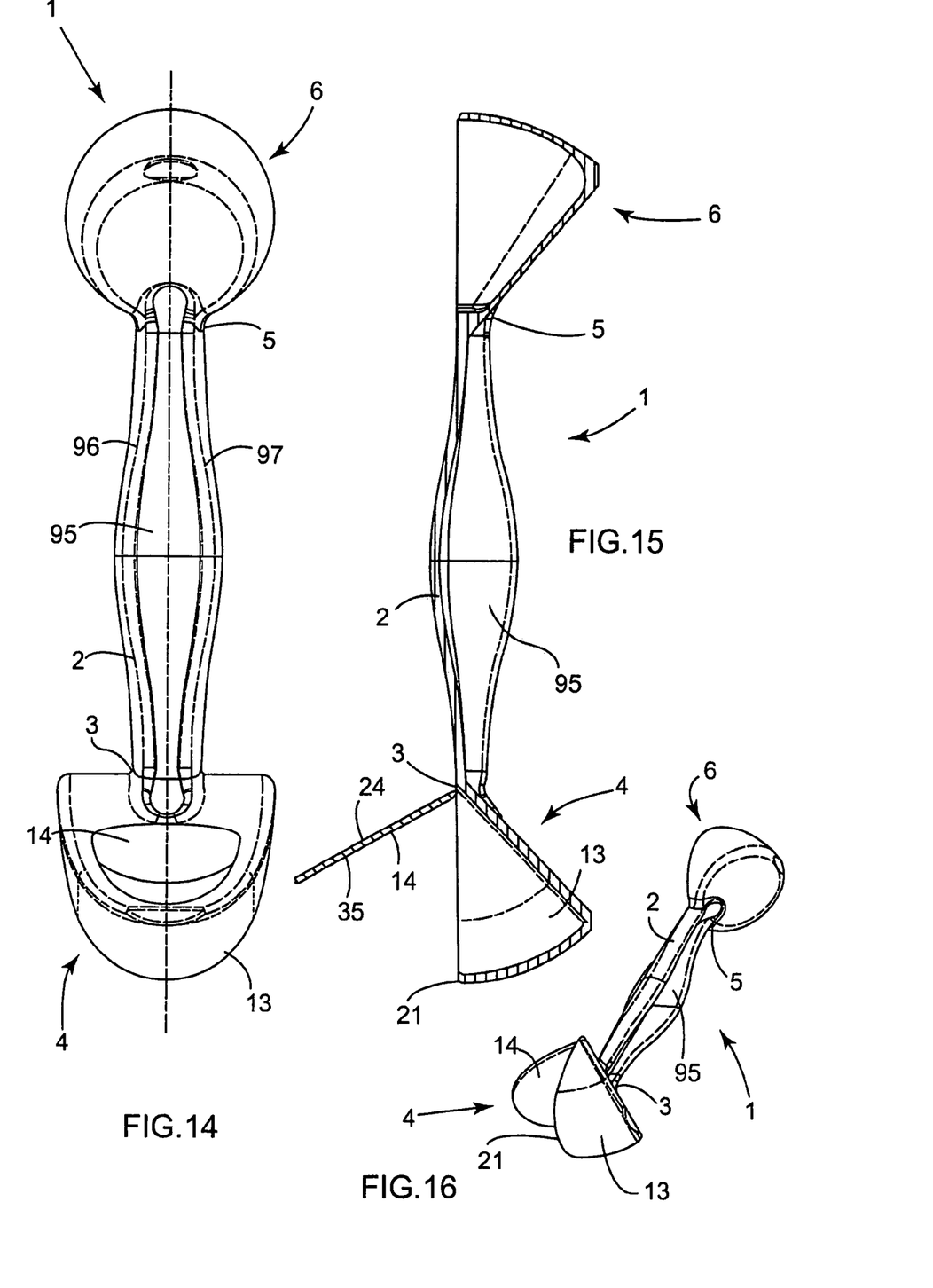
FIG. 14 is a face view of another embodiment of a device of the invention.
FIG. 15 is a side view of the FIG. 14 device.
FIG. 16 is a diagrammatic perspective view of the device of FIGS. 14 and 15.

The embodiment of FIGS. 14 to 16 differs essentially from the embodiments described above in that the handle 2 is made with a recess 95 over a fraction of its length, this recess opening out to one side of the handle 2. This enables the weight of the device 1 to be reduced further, and diminishes the quantity of material that is used.

The measuring scoops 4 or 6 may be made with different shapes.

In the embodiment described, the measuring scoop 6 has an opening of substantially circular section, for example.

The recess 95 may be formed between two cheeks 96 and 97 that are spaced apart by a distance the various on going along the longitudinal axis of the device, with this spacing passing through a maximum substantially halfway along the handle 2, for example, as shown in FIGS. 14 and 16.

Naturally, the invention is not limited to the embodiments described above.

For example, the portions 8 and 9 of the handle 2 in FIG. 3 may be interconnected by a film hinge, not along of their longitudinal side, but at one end of the handle 2.

The handle 2 can be made in some other way, and for example it could be solid.

The flap may be connected to the handle or to the frame in some manner other than via a film hinge, for example the hinge could involve a separate hinge pin.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The term "comprising a" should be understood as being synonymous with "comprising at least one", unless specified to the contrary.

What is claimed is:

1. A portion-taker device for taking a substance, the device including at least one measuring scoop, the scoop comprising:
   a frame including:
      a leading edge; and
      a cavity for taking the substance; and
   a flap mounted to pivot relative to the frame and co-operating with the frame to define, in a first position, a bottom surface of the cavity,
   the frame being arranged in such a manner as to enable a user to exert a force on the flap on a side opposite from the cavity so as to reduce the volume thereof until the flap reaches a second position in which the flap is substantially flush with the leading edge of the frame,
   wherein the first position corresponds to a rest position at which the user does not exert the force on the flap, and wherein the device includes a handle, the flap being connected to the handle by a film hinge, and
   wherein the device is made out of one piece.

2. A device according to claim 1, the flap presenting a substantially plane face facing the cavity when in the first position.

3. A device according to claim 1, the flap pivoting relative to the frame about a pivot axis, the frame presenting an inside surface that is circularly symmetrical about the pivot axis.

4. A device according to claim 1, the flap occupying substantially the entire inside section of the frame between the first and second positions.

5. A device according to claim 1, the flap presenting a free edge having at least a portion that presses against the frame between the first and second positions.

6. A device according to claim 5, the portion that presses against the frame extending at least from the side of the flap that is opposite from the pivot axis.

7. A device according to claim 5, the free edge of the flap having two side portions that press against the frame when the flap is between the first and second positions.

8. A device according to claim 1, the flap presenting a shape that is substantially rectangular in face view.

9. A device according to claim 1, the frame including an opening.

10. A device according to claim 1, the frame being made of a single material.

11. A device according to claim 1, the device being made entirely out of a single material.

12. A device according to claim 1, the frame being arranged in such a manner that the flap pivots through an angle lying in the range 30° to 50° on passing from the first position to the second position.

13. A device according to claim 1, the frame including at least one abutment against which the flap bears when it is in one of its first and second positions.

14. A device according to claim 13, wherein the at least one abutment is operable to prevent the flap from pivoting beyond the second position, away from the first position.

15. The device according to claim 1, the flap being made by molding material integrally with at least one of the frame and a handle of the device.

16. A device according to claim 1, including a hollow handle having a longitudinal axis.

17. A device according to claim 16, the handle comprising two portions that are assembled to each other.

18. A device according to claim 17, the two portions being interconnected by a film hinge.

19. A device according to claim 18, the handle including a coating of a material overmolded on the two portions of the handle, the coating contributing to holding the two portions together.

20. A device according to claim 1, the measuring scoop being disposed at a first end of a handle of the device, the device further comprising:
    a second measuring scoop disposed at a second end of the handle that opposes the first end.

21. A device according to claim 20, wherein a position of the first measuring scoop and a position of the second measuring scoop are offset from each other.

22. A kit comprising:
    a cosmetic; and
    a device according to claim 1.

23. A method of fabricating a device according to claim 1, the method including the following step:
    molding the flap and at least a portion of the frame, the flap being molded in a configuration in which it extends outside the frame.

24. A method of taking a portion of a substance, the method comprising the following steps:
    taking the portion of the substance with a portion-taker device according to claim 1; and
    causing the flap to pivot towards the second position in order to extract the substance from the scoop.

25. A device according to claim 1, the device being made entirely out of two materials.

26. A device according to claim 1, wherein a position of the hinge relative to the frame remains substantially unchanged as the flap is moved from the first position to the second position.

27. A device according to claim 26, wherein at the first position, the hinge does not exert a force on the flap.

28. A portion-taker device for taking a substance, the device including at least one measuring scoop, the scoop comprising:
    a frame including:
        a leading edge; and
        a cavity for taking the substance; and
    a flap mounted to pivot relative to the frame and co-operating with the frame to define, in a first position, a bottom surface of the cavity,
    the frame being arranged in such a manner as to enable a user to exert a force on the flap on a side opposite from the cavity so as to reduce the volume thereof until the flap reaches a second position in which the flap is substantially flush with the leading edge of the frame,
    wherein the first position corresponds to a rest position at which the user does not exert the force on the flap, and
    wherein the frame is closed at the bottom by an elastically deformable membrane.

29. A device according to claim 28, the frame comprising two cheeks interconnected by a distal wall, the elastically deformable membrane defining at least the bottom portion of each of the cheeks.

30. A device according to claim 28, the elastically deformable membrane being made by being overmolded on a rigid portion of the frame.

31. A device according to claim 28, wherein a position of a hinge relative to the frame remains substantially unchanged as the flap is moved from the first position to the second position.

32. A device according to claim 31, wherein at the first position, the hinge does not exert a force on the flap.

* * * * *